United States Patent [19]

Hewlett

[11] Patent Number: 5,650,821
[45] Date of Patent: Jul. 22, 1997

[54] VIDEO CAMERA SUPPORT WITH COUNTERBALANCE

[76] Inventor: Kenneth Hewlett, 9839 - 91 Avenue, Edmonton, Alberta, Canada, T6E 2T5

[21] Appl. No.: 437,802

[22] Filed: May 9, 1995

[51] Int. Cl.$^6$ .................................................. H04N 5/225
[52] U.S. Cl. ........................ 348/373; 348/376; 396/421; 396/428
[58] Field of Search ...................... 348/373, 375, 348/376; 354/80, 81, 82, 293, 295; 396/419, 420, 422, 425, 428; H04N 5/225

[56] References Cited

U.S. PATENT DOCUMENTS

| | | | |
|---|---|---|---|
| 4,121,799 | 10/1978 | Michio | 248/171 |
| 4,158,490 | 6/1979 | Gottschalk et al. | 352/243 |
| 4,437,753 | 3/1984 | Dunn | 354/293 |
| 4,545,660 | 10/1985 | Rudolf | 354/82 |
| 5,036,343 | 7/1991 | Yamanaka | 354/82 |
| 5,229,798 | 7/1993 | Brown | 352/243 |
| 5,421,549 | 6/1995 | Richards | 248/163.2 |
| 5,510,863 | 4/1996 | Kliewer | 354/81 |

FOREIGN PATENT DOCUMENTS

| | | |
|---|---|---|
| 687588 | 1/1953 | United Kingdom . |
| 2234829 | 2/1991 | United Kingdom ............ F16M 13/04 |
| WO 88/06695 | 9/1988 | WIPO ................. F16M 13/04 |

OTHER PUBLICATIONS

Glidecam Industries Advertisement, Copyright 1994.

Primary Examiner—Wendy Garber
Assistant Examiner—Ngoc-Yen Vu
Attorney, Agent, or Firm—Anthony R. Lambert

[57] ABSTRACT

A video camera support with counterbalance includes a tubular camera support having a first end and a second end. A camera mounting bracket is positioned at the first end of the camera support. A counterbalance assembly is positioned at the second end of the camera support. The counterbalance assembly includes a transversely positioned counterweight mounting bracket having a first end and a second end. A first tubular member is provided having an attachment end and a counterweight end. The attachment end of the first tubular member is pivotally connected to the first end of the counterweight mounting bracket for pivotal movement between a stored position substantially parallel to the camera support and an operative position extending away from the camera support. A second tubular member is provided having an attachment end and a counterweight end. The attachment end of the second tubular member is pivotally connected to the second end of the counterweight mounting bracket for pivotal movement between a stored position substantially parallel to the camera support and an operative position extending away from the camera support.

6 Claims, 7 Drawing Sheets

VIDEO CAMERA SUPPORT WITH COUNTERBALANCE

FIELD OF THE INVENTION

The present invention relates to a camera support for a video camera that includes a counterbalance to create an inertial effect which keeps the camera steady while the user is in motion.

BACKGROUND OF THE INVENTION

Uncontrolled sudden movement of a video camera during taping is undesirable, as such movement is noticeable in the resulting film. For this reason, a track and dolly system is often used to carry the camera during the shooting of motion pictures. Where the use of a track and dolly system is not practical, elaborate camera supports are used. PCT Publication WO 88/06695 published Sep. 7, 1988 illustrates such a camera support. It includes a body harness to support the weight of the camera, and a counterbalance to create an inertial effect which keeps the camera steady while the user is in motion.

While an amateur does not require a camera support that is nearly as elaborate as those used by the professionals, the principles taught in publications such as WO 88/06695 are useful in taking quality home movies using a video camera.

SUMMARY OF THE INVENTION

What is required is video camera support with a counterbalance that meets the needs of amateur users.

According to the present invention there is provided a video camera support with counterbalance which includes an elongate body having a first end and a second end. A camera mounting bracket is positioned at the first end of the elongate body. A counterbalance assembly is positioned at the second end of the elongate body. The counterbalance assembly includes a transversely positioned counterweight mounting bracket having a first end and a second end. An elongate first member is provided having an attachment end and a counterweight end. The attachment end of the first member is pivotally connected to the first end of the counterweight mounting bracket for pivotal movement between a stored position substantially parallel to the elongate body and an operative position extending away from the elongate body. An elongate second member is provided having an attachment end and a counterweight end. The attachment end of the second member is pivotally connected to the second end of the counterweight mounting bracket for pivotal movement between a stored position substantially parallel to the elongate body and an operative position extending away from the elongate body. Counterweights are disposed in the counterweight ends of the first member and the second member. Stop means are provided to limit the pivotal movement of the first member and the second member in the operative position.

The camera support with counterbalance, as described above, folds up into a stored positioned that is even more compact then a camera tripod, with the first member and the second member positioned parallel to the elongate body. In the operative position, the first member and the second member are extended to position the counterweights of the counterbalance assembly to create an inertial effect which keeps the camera steady while the user is in motion.

Although beneficial effects can be obtained through the use of the video camera support with counterbalance, as described above, it is desirable that the relative position of the camera mounting bracket and the counterbalance assembly be capable of being altered. This adjustment is required to meet the needs of different lenses, different cameras, different camera mounting positions on the camera mounting bracket and different kinds of shots. For example, there may not be sufficient room to move around a dining room table with first member and the second member extending laterally in relation to the camera mounting bracket. It may, therefore, be desirable to place the first member and the second member at an angle, that takes up less space and yet achieves the required inertial effect. Even more beneficial results may, therefore, be obtained when the elongate body includes an outer tubular member and an inner tubular member telescopically received within the outer tubular member. The camera mounting bracket is secured to one of the members and the counterbalance assembly is secured to the other of the members. The inner tubular member is rotatable relative to the outer tubular member whereby the angular relationship between the camera mounting bracket and the counterbalance assembly is altered.

Although beneficial effects may be obtained through the use of the video camera support with counterbalance, as described above, it is preferred that the elongate body always be gripped at its center of gravity. Even more beneficial effects may, therefore, be obtained when a handgrip is positioned over center of gravity of the elongate body. The center of gravity of the elongate body changes depending upon the camera used and it's point of attachment to the camera mounting bracket. It is, therefore, preferred that the handgrip be movable axially along the elongate body whereby the handgrip is positionable over a center of gravity of the elongate body, should that center of gravity be altered. Means is provided for locking the handgrip in a selected axial position.

Although beneficial effects may be obtained through the use of the video camera support with counterbalance, as described above, human beings have great difficulty in holding their hands perfectly still. A person's hand tends to oscillate, which oscillation is often detectable in the resulting film. Even more beneficial effects may, therefore, be obtained when the handgrip is supported by bearings for rotation about the elongate body, thereby diminishing the effect of oscillating hand movements.

Although beneficial effects may be obtained through the use of the video camera support with counterbalance, as described above, having the handgrip supported by bearings for rotation about the tubular camera support creates problems where the users intent is to take a sweeping shot with the video camera. In such cases, the user does not wish the handgrip to rotate on its bearings. Even more beneficial effects may, therefore, be obtained when the handgrip is deformable, such that rotational movement of the handgrip is controllable by exerting pressure upon the handgrip to deform the handgrip until the handgrip engages the elongate body to brake such rotational movement.

Although beneficial effects may be obtained through the use of the video camera support with counterbalance, as described above, in order to increase the inertial effect one must either increase the amount of the weights or space the weights farther apart. Even more beneficial effects may, therefore, be obtained when both the first member and the second member are both telescopically extendable. The use of telescopically extendible members is considered to be a more desirable manner of increasing the inertial effect than adding weight. As weight is added the camera becomes increasingly difficult to support with one hand. To get the same inertial effect by the addition of weight would make it necessary to support the weight of the camera and associated counterbalance assembly be means of a body harness.

BRIEF DESCRIPTION OF THE DRAWINGS

These and other features of the invention will become more apparent from the following description in which reference is made to the appended drawings, wherein.

DETAILED DESCRIPTION OF THE PREFERRED EMBODIMENT

Figure 1:
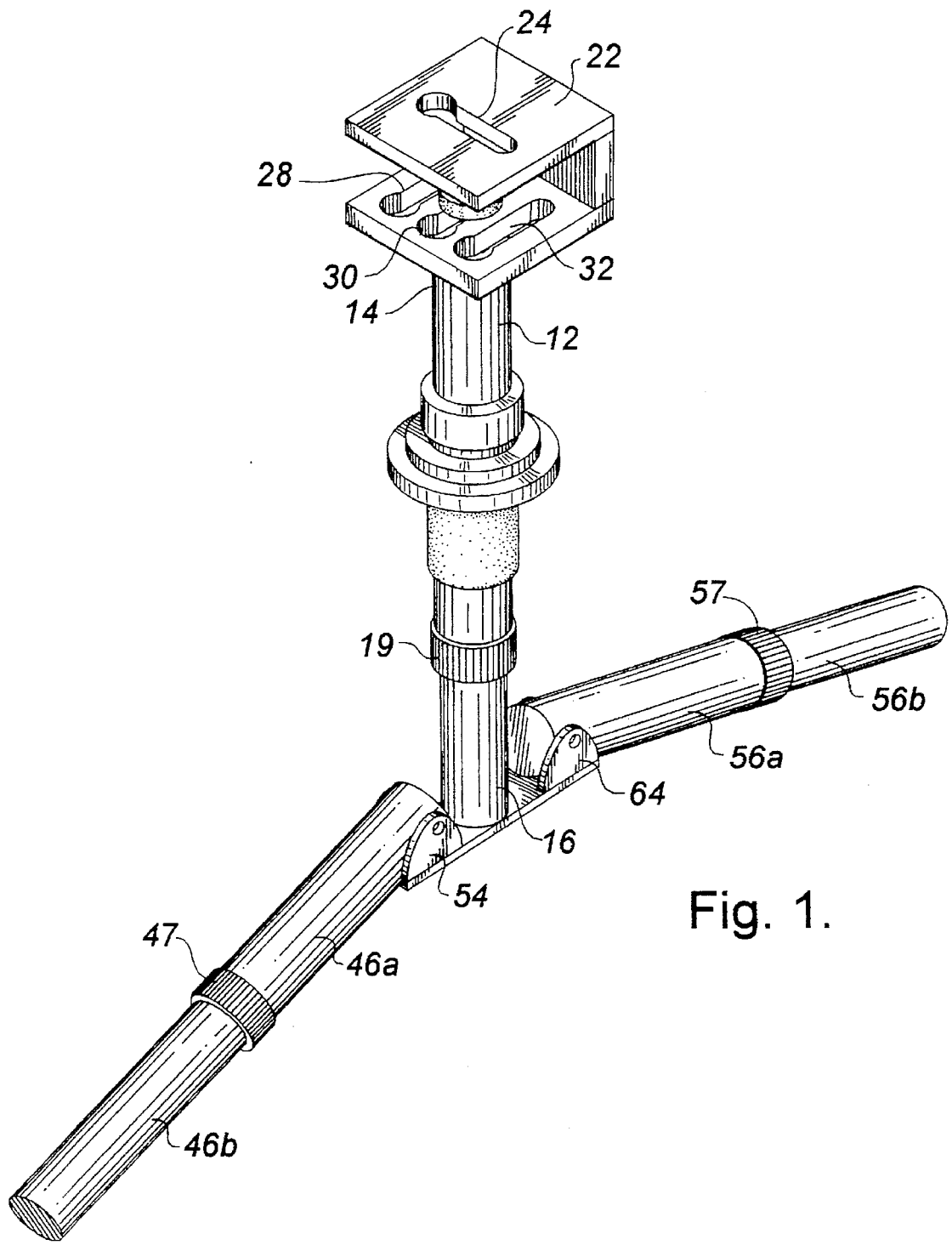
FIG. 1 is a perspective view of a video camera support with counterbalance constructed in accordance with the teachings of the present invention.

The preferred embodiment, a video camera support with counterbalance generally identified by reference numeral 10, will now be described with reference to FIGS. 1 through 7.

Figure 2:
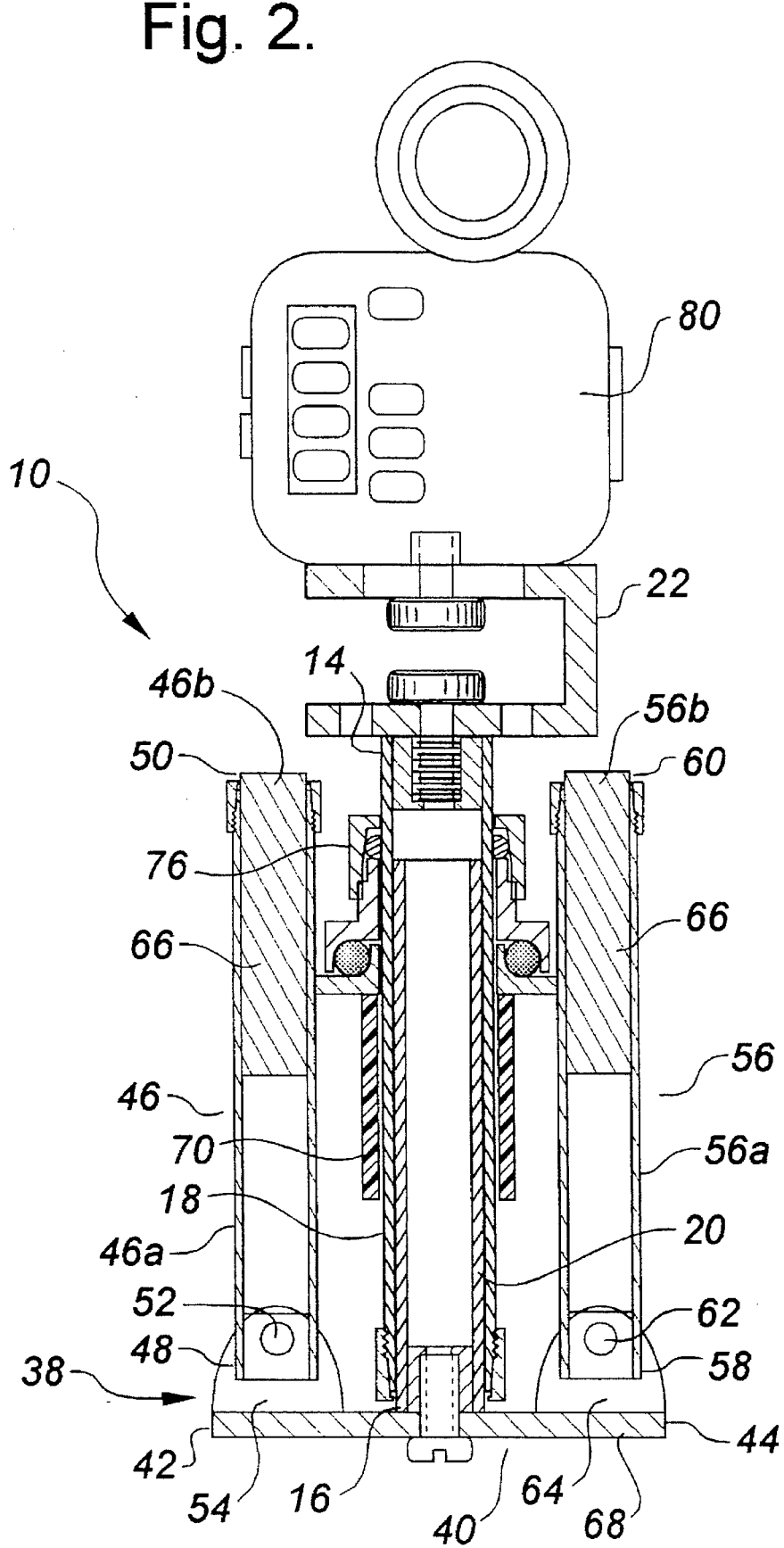
FIG. 2 is a side elevation view in section of the video camera support with counterbalance illustrated in FIG. 1, in a stored position.
Figure 3:
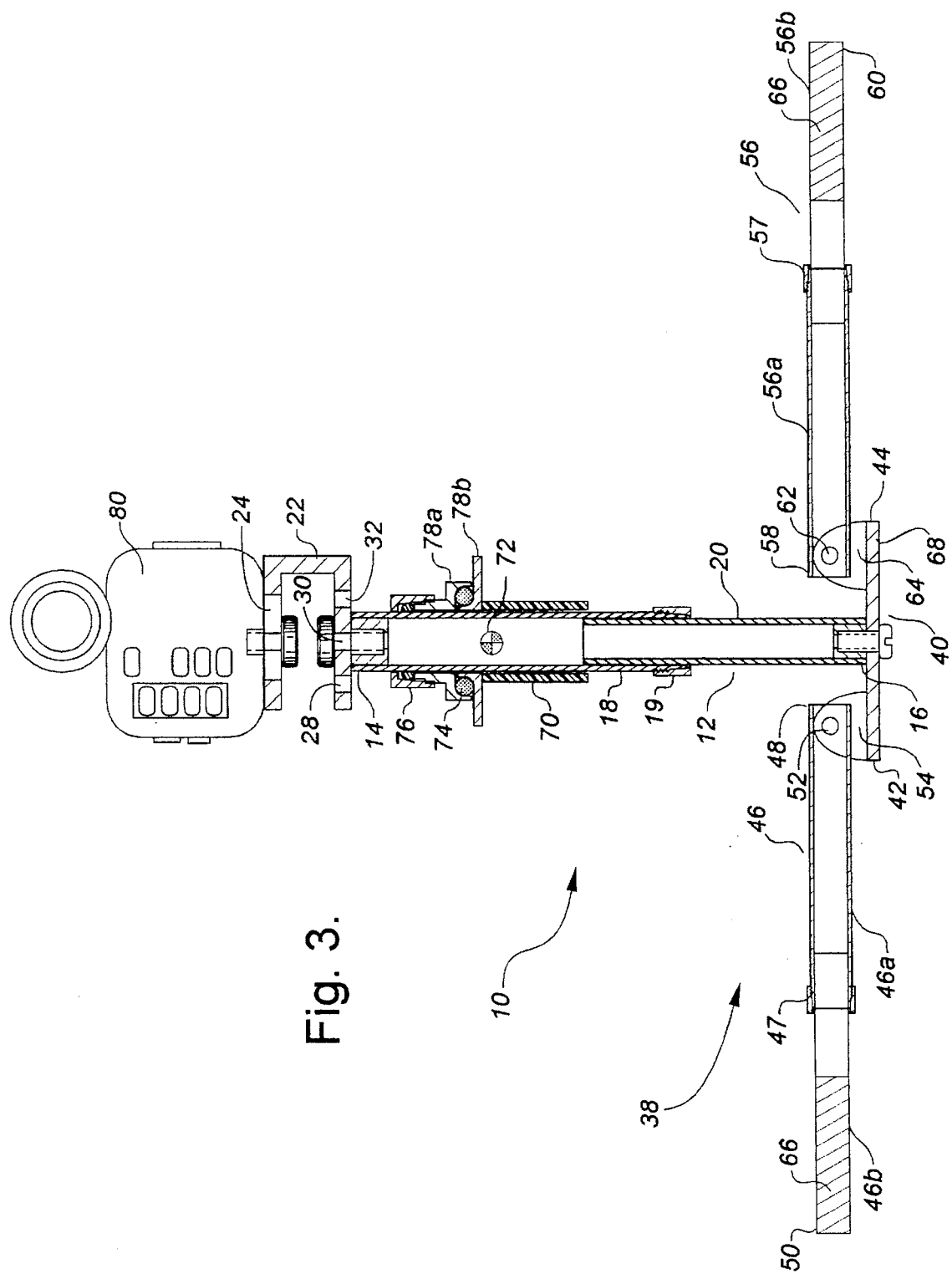
FIG. 3 is a side elevation view in section of the video camera support with counterbalance illustrated in FIG. 1, in an operative position.
Figure 4:
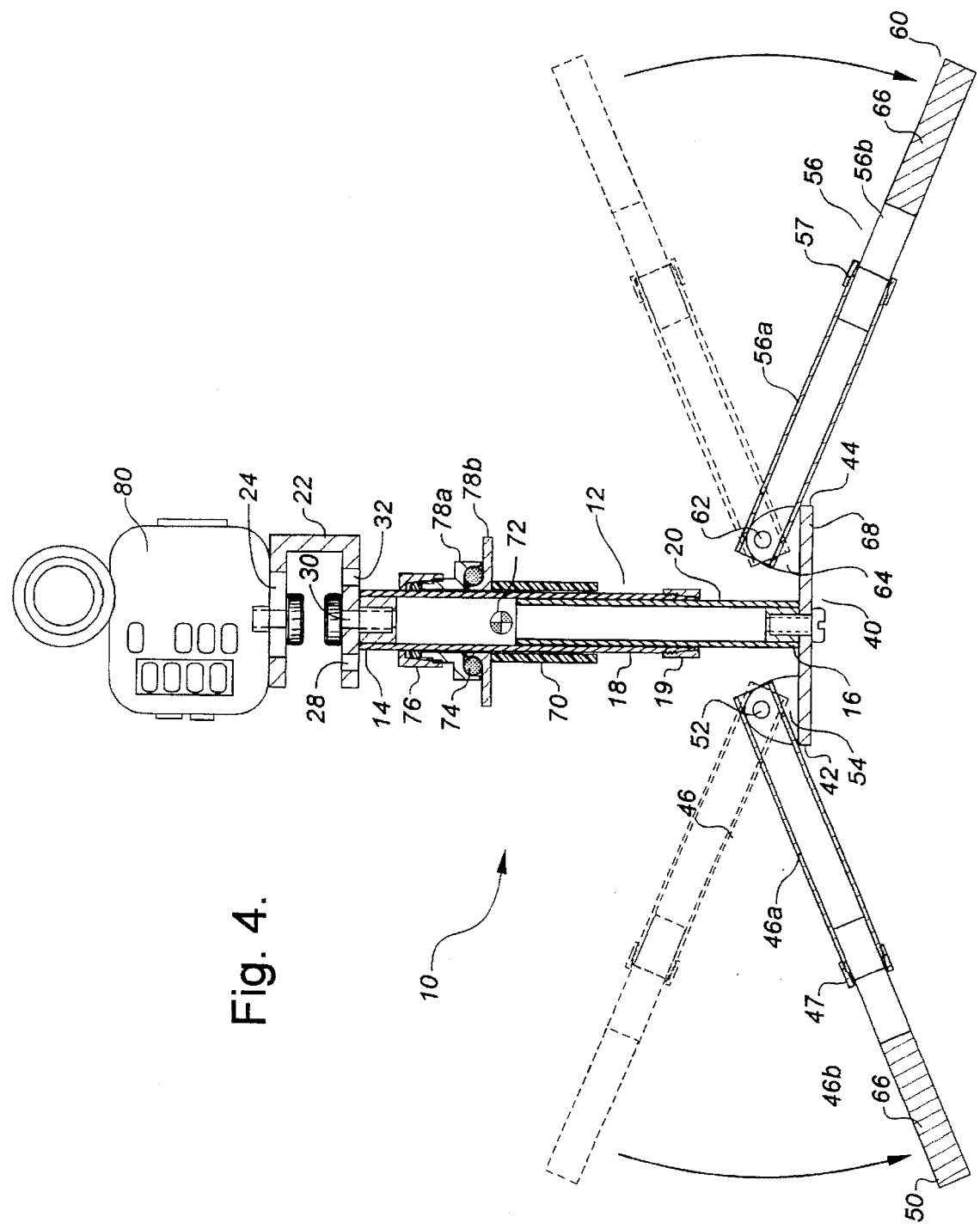
FIG. 4 is a side elevation view in section of the video camera support with counterbalance illustrated in FIG. 1, in an operative position.
Figure 5:
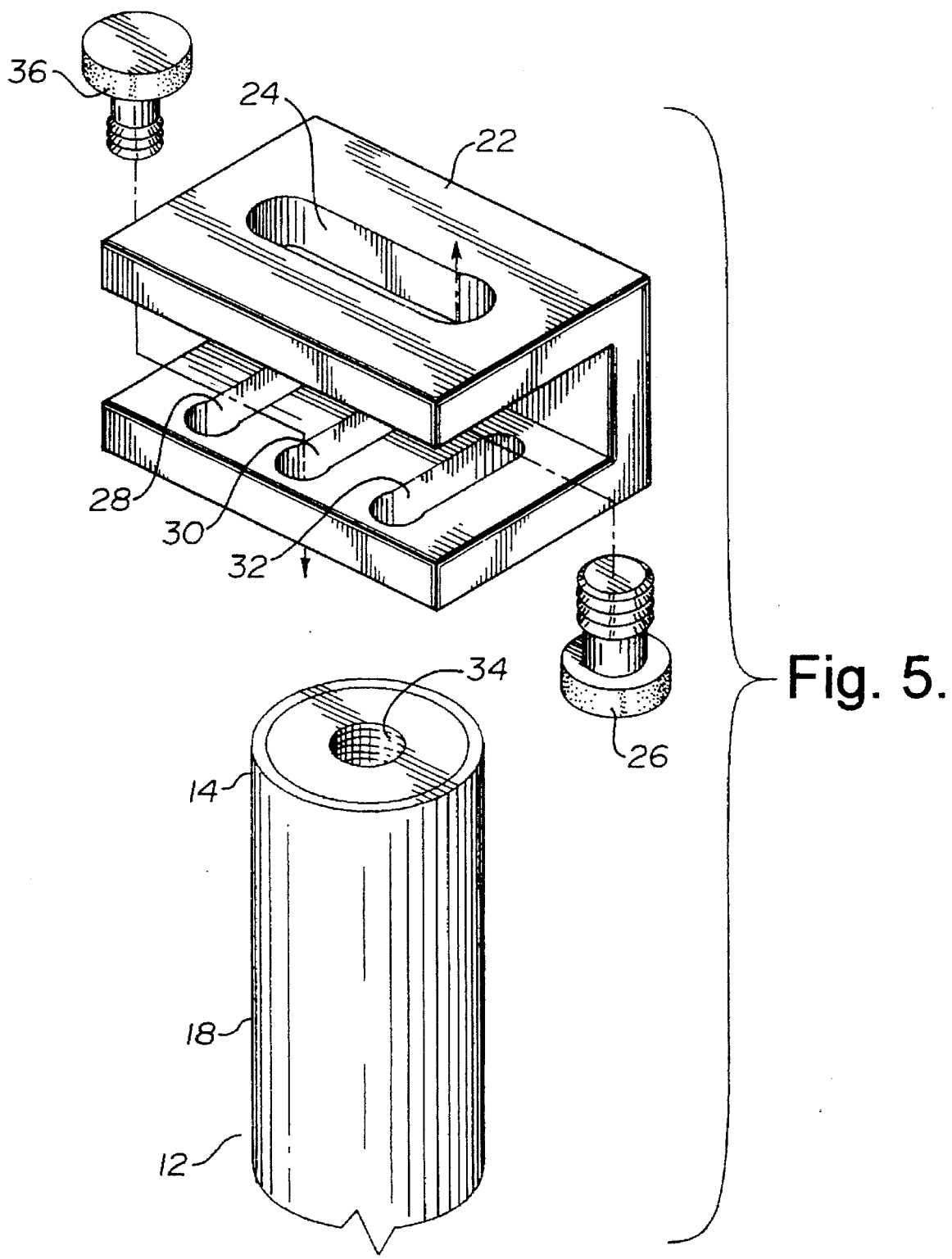
FIG. 5 is a detailed perspective view of the camera mounting bracket for the video camera support with counterbalance illustrated in FIG. 1.
Figure 6:
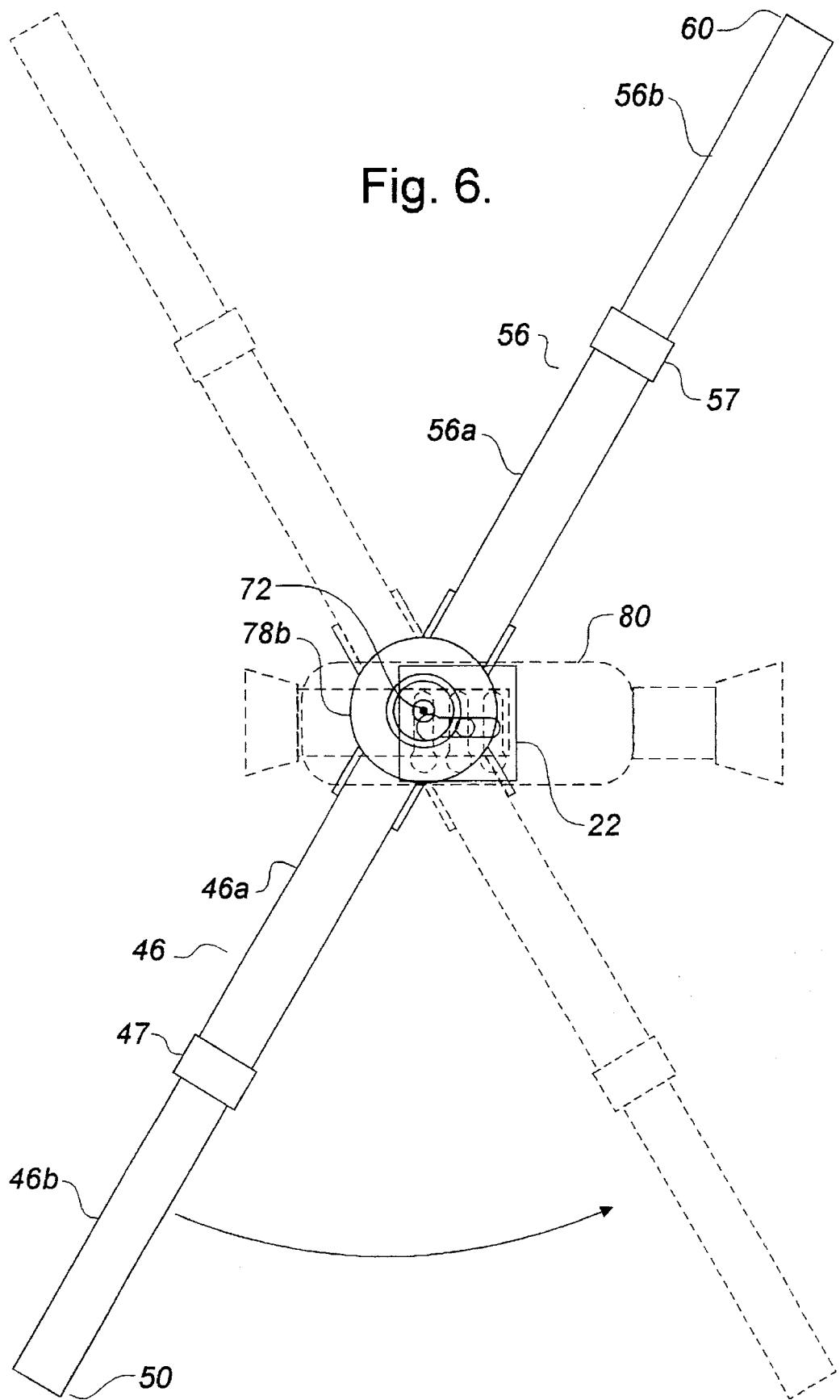
FIG. 6 is a top plan view of the video camera support with counterbalance illustrated in FIG. 3, in an operative position.

Referring to FIGS. 2 and 3, video camera support 10 includes an elongate tubular body that serves as a camera support 12 having a first end 14 and a second end 16. Tubular camera support 12 has an outer tubular member 18 and an inner tubular member 20 telescopically received within outer tubular member 18. Outer tubular member 18 and inner tubular member are maintained in a selected telescopic position by means of screw clamp 19. A camera mounting bracket 22 is positioned at first end 14 of tubular camera support 12. Referring to FIG. 5, camera mounting bracket 22 has one longitudinal slot 24 to which a camera (not shown) is mounted by means of thumb screw 26. Camera mounting bracket 22 also has three transverse slots 28, 30, and 32, which represent alternative mounting positions for camera mounting bracket 22. Camera mounting bracket 22 is secured to a threaded aperture 34 at first end 14 of tubular camera support 12 by means of thumb screw 36. Referring to FIGS. 2 and 3, a counterbalance assembly, generally indicated by reference numeral 38, is positioned at second end 16 of tubular camera support 12. Counterbalance assembly 38 includes a transversely positioned counterweight mounting bracket 40 having a first end 42 and a second end 44. A telescopically extendible first tubular member 46 is provided having an attachment end 48 and a counterweight end 50. First tubular member 46 includes two telescopically mating components 46a and 46b. Mating components 46a and 46b can be locked in a selected telescopic position by means of a screw clamps 47. Attachment end 48 of first tubular member 46 is pivotally connected by a mounting pin 52 to a mounting fin 54 positioned at first end 42 of counterweight mounting bracket 40. First tubular member 46 is pivotally movable between a stored position substantially parallel to tubular camera support 12, as illustrated in FIG. 2 and an operative position extending away from tubular camera support 12, as illustrated in FIG. 3. A telescopically extendible second tubular member 56 is provided having an attachment end 58 and a counterweight end 60. Second tubular member includes two telescopically mating components 56a and 56b. Mating components 56a and 56b can be locked in a selected telescopic position by means of screw clamps 57. Attachment end 58 of second tubular member 56 is pivotally connected by a mounting pin 62 to a mounting fin 64 positioned at second end 44 of counterweight mounting bracket 40. Second tubular member 56 is pivotally movable between a stored position substantially parallel to tubular camera support 12, as illustrated in FIG. 2, and an operative position extending away from tubular camera support 12, as illustrated in FIG. 3. Referring to FIGS. 2 and 3, counterweights 66 are disposed in counterweight ends 50 and 60 of first tubular member 46 and second tubular member 56, respectively. Referring to FIG. 4, transverse counterweight mounting bracket 40 includes a bottom plate 68 that serves as stop means to limit the pivotal movement of first tubular member 46 and second tubular member 56 in the operative position. Referring to FIG. 6, inner tubular member 20 of tubular camera support 12 is rotatable relative to outer tubular member 18 whereby the angular relationship between camera mounting bracket 22 and counterbalance assembly 38 is altered. Referring to FIGS. 2 and 3, a handgrip 70 is positioned over outer tubular member 18 of tubular camera support 12 at a center of gravity 72 of said tubular camera support 12. Handgrip 70 is supported by bearings 74 for rotation about outer tubular member 18 of tubular camera support 12, thereby diminishing the effect of oscillating hand movements. The ability of handgrip 70 to freely rotate about outer tubular member 18 on bearings 74 is controlled by having handgrip 70 deformable. Rotational movement of handgrip 70 is controlled during filming by exerting pressure upon handgrip 70 with ones hand to deform handgrip 70 until handgrip 70 to engage outer tubular member 18 of tubular camera support 12 to brake such rotational movement. Handgrip 70 is movable axially along the elongate body that serves as camera support 12, whereby the handgrip is positionable over a center of gravity of the elongate body, should that center of gravity be altered. A threaded clamping member 76 exerts a clamping force to lock handgrip 70 in a selected axial position.

Figure 7:
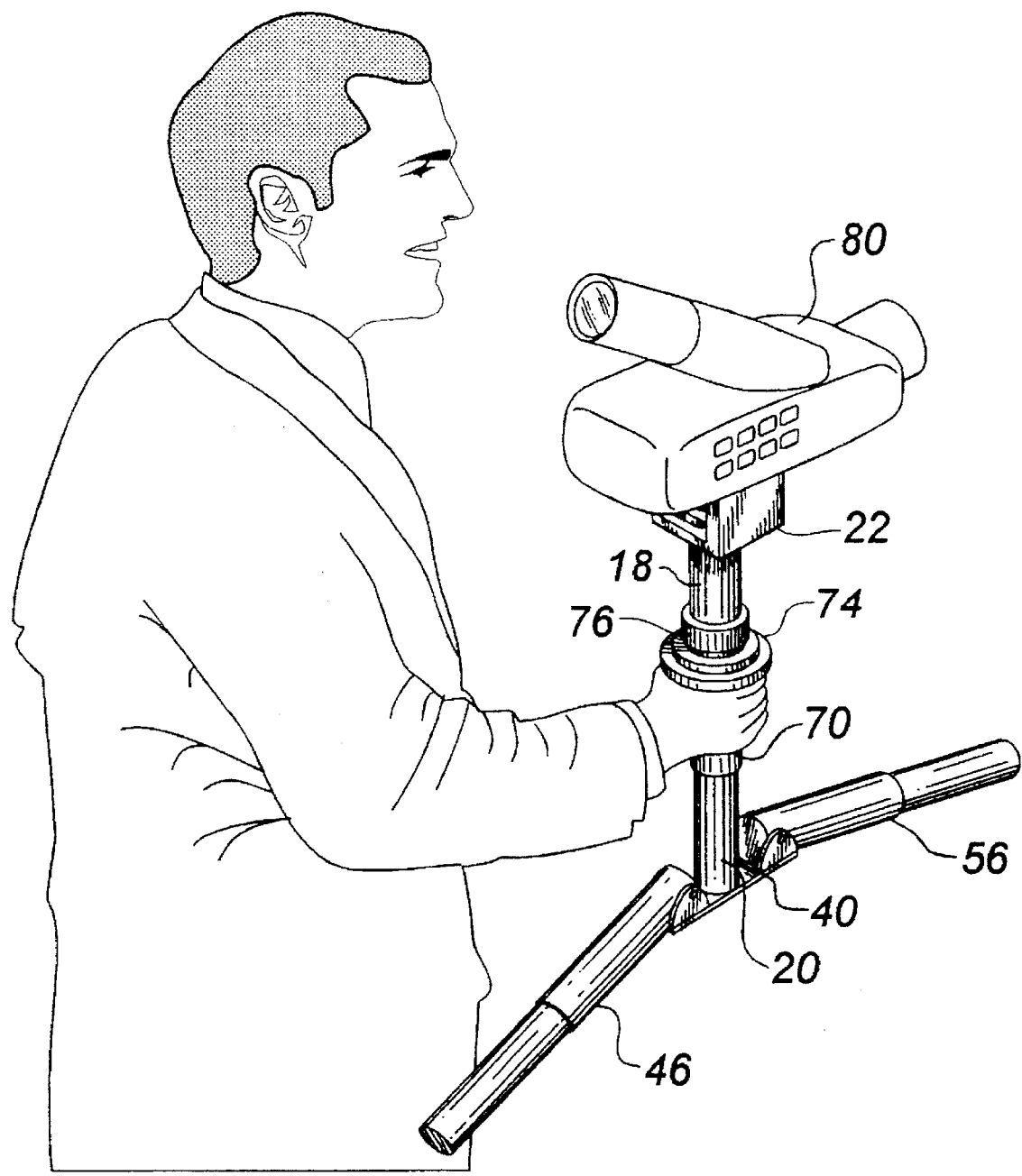
FIG. 7 is a perspective view of the video camera support with counterbalance illustrated in FIG. 1, in an operative position.

The use and operation of video camera support with counterbalance 10 will now be described with reference to FIGS. 1 through 7. Video camera support with counterbalance 10 comes in a stored position, as illustrated in FIG. 2. It must be moved into an operative position, as illustrated in FIGS. 1, 3, and 4. This is accomplished by pivoting first tubular member 46 and second tubular member 56 into the operative position, and then telescopically extending them to space counterweights 66 as far apart as is possible. With all adjustments it is important that they do not disrupt the balanced relationship with the center of gravity 72. Center of gravity 72 shifts with adjustments that are made. It is important to note that it has a vertical component and a horizontal component. The movement of camera support 10 can be compared to that of a ship upon the ocean in that it is subject pitch, roll and yaw during acceleration and deceleration if not properly balanced. It will be appreciated that the extension of first tubular member 46 and second tubular member 56 must be done in a symmetrical fashion in order to maintain the vertical component of center of gravity 72 along a vertical axis coexistent with the elongate body that serves as camera support 12. If this relationship is not maintained camera 80 will tend to pull to one side when accelerated or decelerated. The three transverse slots 28, 30, and 32, represent alternative mounting positions on camera mounting bracket 22 for the mounting of camera 80. When selecting a mounting position, slot 28, 30 or 32 must be selected which will as closely as possible maintain the vertical component of center of gravity 72, ie. the center of gravity of camera 80, down the center of camera support 12. In other words, it is undesirable to have camera 80 positioned so that it tends to tip camera support 12 in a particular direction. When counterweights 66 are symmetrically positioned and camera 80 is mounted as described, camera support 12 provides a vertical rotational axis. In such a case, the rotation of counterweights 66 about camera support 12 will not affect the balance of video camera support 10. A rotation of counterweights 66 is frequently required during use in order to achieve the best body position during execution of camera shots. Tubular camera support 12 is then moved to an operative position by telescopically extending inner tubular member 20 relative to outer tubular member 18. Camera support 12 is intended to be gripped by handgrip 70. This means that handgrip 70 must be axially positioned along the elongate body of camera support 12 so that the horizontal component of center of gravity 72 is positioned along bearing housing 78b, which is positioned directly above handgrip 70, and which rests upon the user's hand. This adjustment is made with threaded clamping member 76. The relative rotational positioning of camera mounting bracket 22 and counterbalance assembly 38 can be adjusted by rotation of inner tubular member 20 relative to outer tubular member 18. In this way the user rotationally positions counterweights 66 to accommodate the body position which must be assumed when making a particular shot. Referring to FIG. 7, the user then is able to walk about filming, with counterbalance assembly 38 creating the desired inertial effect to keep camera 80 steady while the user is in motion. Any oscillating hand movement are accommodated by movement of handgrip 70 on bearings 74. The user can control rotational movement of handgrip 70, as circumstances demand, by deforming handgrip 70 until handgrip 70 engages outer tubular member 18 of tubular camera support 12 to brake such rotational movement.

It will be apparent to one skilled in the art that modifications may be made to the illustrated embodiment without departing from the spirit and scope of the invention as hereinafter defined in the claims.

The embodiments of the invention in which an exclusive property or privilege is claimed are defined as follow:

1. A video camera support with counterbalance, comprising:

an elongate body having a first end and a second end;

a camera mounting bracket positioned at the first end of the body;

a counterbalance assembly positioned at the second end of the body, the counterbalance assembly including a transversely positioned counterweight mounting bracket having a first end and a second end, an elongate first member having an attachment end and a counterweight end, the attachment end o the first member being pivotally connected to the first end of the counterweight mounting bracket for pivotal movement between a stored position substantially parallel to the camera support and an operative position extending away from the camera support, an elongate second member having an attachment end and a counterweight end, the attachment end of the second member being pivotally connected to the second end of the counterweight mounting bracket for pivotal movement between a stored position substantially parallel to the camera support and an operative position extending away from the camera support;

counterweights disposed in the counterweight ends of the first member and the second member;

stop means to limit the pivotal movement of the first member and the second member in the operative position; and a handgrip positioned over the elongate body, the handgrip being supported by bearings for rotation about the elongate body, thereby diminishing the effect of oscillating hand movements.

2. The video camera support with counterbalance as defined in claim 1, wherein the elongate body includes an outer tubular member and an inner tubular member telescopically received within the outer tubular member, the inner tubular member being rotatable relative to the outer tubular member whereby an angular relationship between the camera mounting bracket and the counterbalance assembly is altered.

3. The video camera support with counterbalance as defined in claim 1, wherein the handgrip is movable axially along the elongate body whereby the handgrip is positionable over a center of gravity of the elongate body, means belong provided for looking the handgrip in a selected axial position.

4. The video camera support with counterbalance as defined in claim 1, wherein the handgrip is deformable, such that rotational movement of the handgrip is controllable by exerting pressure upon the handgrip to deform the handgrip until the handgrip engages the elongate body to brake such rotational movement.

5. The video camera support with counterbalance as defined in claim 1, wherein both elongate the first member and the elongate second member are both extendable.

6. A video camera support with counterbalance, comprising:

an elongate body having a first end and a second end, the elongate body including an outer tubular member and an inner tubular member telescopically received within the outer tubular member;

a camera mounting bracket positioned at the first end of the elongate body;

a counterbalance assembly positioned at the second end of the elongate body, the inner tubular member of the elongate body being rotatable relative to the outer tubular member whereby the angular relationship between the camera mounting bracket and the counterbalance assembly is altered, the counterbalance assembly including a transversely positioned counterweight mounting bracket having a first end and a second end, a telescopically extendible first tubular member having an attachment end and a counterweight end, the attachment end of the first tubular member being pivotally connected to the first end of the counterweight mounting bracket for pivotal movement between a stored position substantially parallel to the elongate body and an operative position extending away from the elongate body, a telescopically extendible second tubular member having an attachment end and a counterweight end, the attachment end of the second tubular member being pivotally connected to the second end of the counterweight mounting bracket for pivotal movement between a stored position substantially parallel to the elongate body and an operative position extending away from the elongate body;

counterweights disposed in the counterweight ends of the first tubular member and the second tubular member;

the transverse counterweight mounting bracket including a bottom plate that serves as stop means to limit the pivotal movement of the first tubular member and the second tubular member in the operative position; and a handgrip positioned over the outer tubular member of the elongate body, the handgrip being movable axially along the elongate body whereby the handgrip is positionable over a center of gravity of the elongate body, means being provided for locking the handgrip in a selected axial position, the handgrip being supported by bearings for rotation about the elongate body, thereby diminishing the effect of oscillating hand movements, the handgrip being deformable, such that rotational movement of the handgrip is controllable by exerting pressure upon the handgrip to deform the handgrip until the handgrip engages the elongate body to brake such rotational movement.

* * * * *